United States Patent
Hirano

(10) Patent No.: US 10,071,564 B2
(45) Date of Patent: Sep. 11, 2018

(54) CONTROL APPARATUS, IMAGE PROCESSING METHOD AND NON-TRANSITORY RECORDING MEDIUM STORING IMAGE PROCESSING PROGRAM

(71) Applicant: KONICA MINOLTA, INC., Chiyoda-ku, Tokyo (JP)

(72) Inventor: Sachiko Hirano, Hino (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 15/695,248

(22) Filed: Sep. 5, 2017

(65) Prior Publication Data

US 2018/0065377 A1 Mar. 8, 2018

(30) Foreign Application Priority Data

Sep. 7, 2016 (JP) .................................. 2016-174400

(51) Int. Cl.
  *G03F 3/08* (2006.01)
  *B41J 2/21* (2006.01)
  (Continued)

(52) U.S. Cl.
  CPC ........... *B41J 2/2117* (2013.01); *B41J 2/2056* (2013.01); *G06F 3/1219* (2013.01); *H04N 1/52* (2013.01); *H04N 1/54* (2013.01); *H04N 1/6002* (2013.01)

(58) Field of Classification Search
  USPC ........................................ 358/1.9, 2.99, 518
  See application file for complete search history.

(56) References Cited

U.S. PATENT DOCUMENTS 5,619,347 A * 4/1997 Taniguchi ............... H04N 9/735
  348/223.1
2005/0226498 A1 10/2005 Lee
  (Continued)

FOREIGN PATENT DOCUMENTS

JP 2009-029079 A 2/2009
JP 2009-055600 A 3/2009

OTHER PUBLICATIONS

Extended European Search Report issued in corresponding European Patent Application No. 17139375.3-1903, dated Apr. 2, 2013. (8 pages).

*Primary Examiner* — Lam Nguyen
(74) *Attorney, Agent, or Firm* — Buchanan Ingersoll & Rooney PC

(57) ABSTRACT

Provided are a control apparatus, an image processing method and a non-transitory recording medium. The control apparatus includes a raster-image processor and a hardware processor that judges whether each of multi-valued pixels forming a source image is colored in one of specific colors, controls the amount of color materials to be used in printing the source image together with a white base, by reducing pixel values of the multi-valued pixels forming the source image and the white base, and converts the multi-valued pixels into two-valued pixels corresponding to colors of the color materials of the source image and two-valued white pixels. The hardware processor uses a matrix of two-valued white pixels corresponding to each of the multi-valued pixels judged as being colored in one of the specific colors, to rearrange at least one of colored two-valued white pixels at colored or uncolored pixel positions in the matrix.

18 Claims, 10 Drawing Sheets

(51) Int. Cl.
*B41J 2/205* (2006.01)
*G06F 3/12* (2006.01)
*H04N 1/52* (2006.01)
*H04N 1/54* (2006.01)
*H04N 1/60* (2006.01)

(56) References Cited

U.S. PATENT DOCUMENTS

2006/0256356 A1* 11/2006 Furuya ................. H04N 1/3333
  358/1.9
2009/0033956 A1  2/2009 Tamagawa
2009/0033961 A1  2/2009 Tamagawa
2015/0022832 A1  1/2015 Choulet
2016/0109838 A1  4/2016 Kuo

* cited by examiner

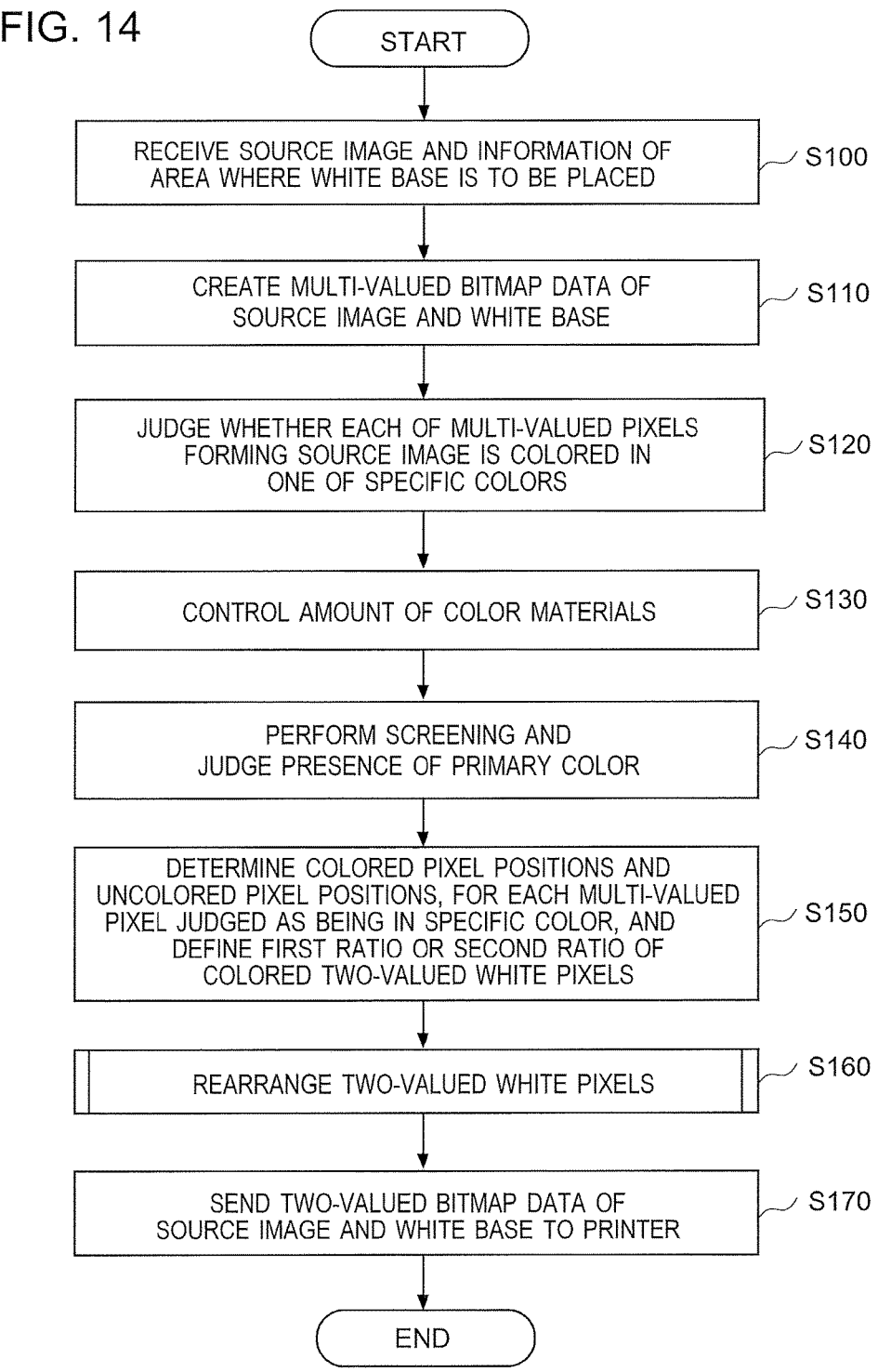

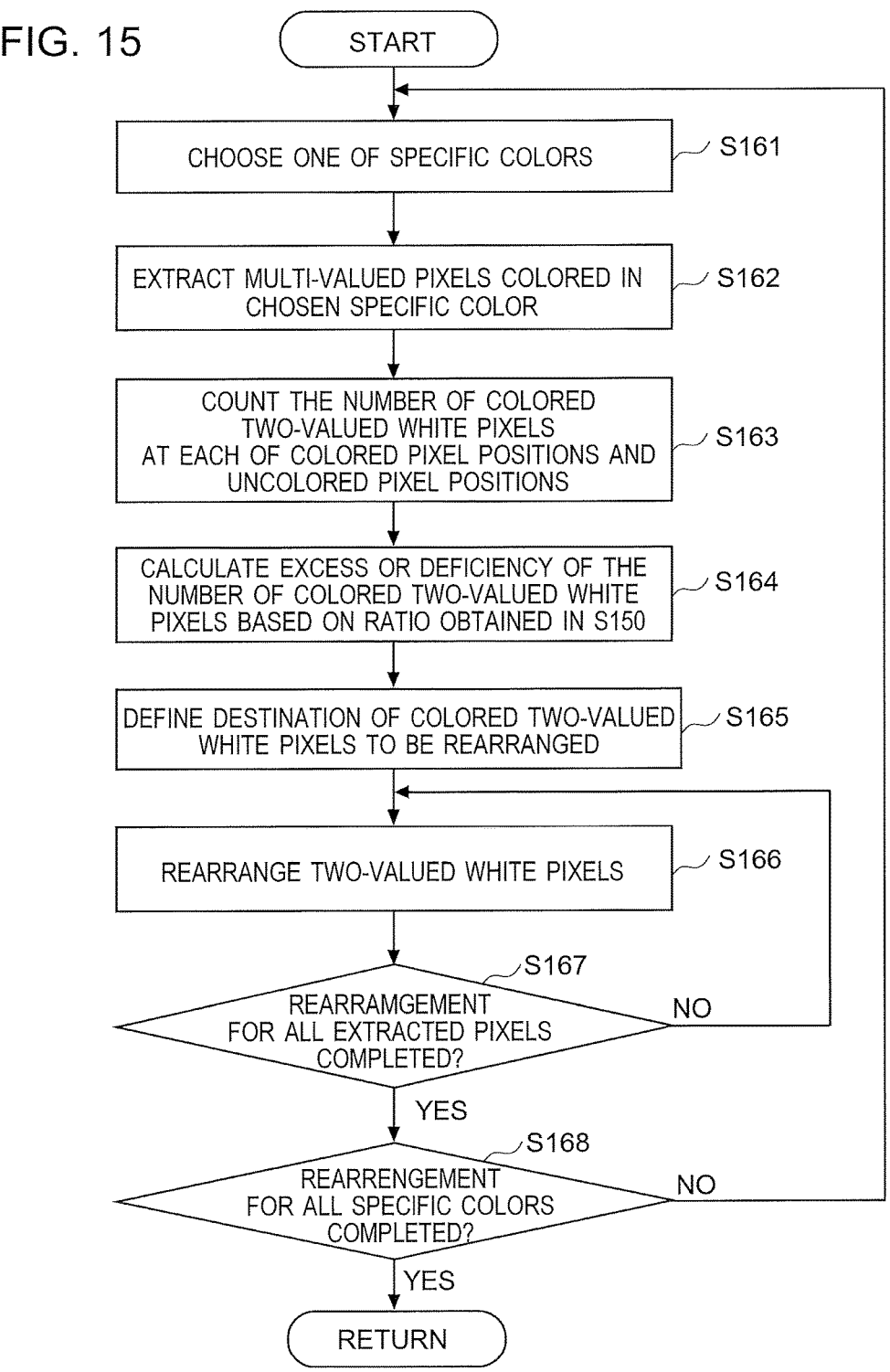

CONTROL APPARATUS, IMAGE PROCESSING METHOD AND NON-TRANSITORY RECORDING MEDIUM STORING IMAGE PROCESSING PROGRAM

Japanese Patent Application No. 2016-174400 filed on Sep. 7, 2016, including description, claims, drawings, and abstract, the entire disclosure of which is incorporated herein by reference in its entirety.

TECHNICAL FIELD

The present invention is directed to control apparatuses, image processing methods and non-transitory recording media each storing an image processing program. In particular, the present invention is directed to a control apparatus for controlling a process of printing a source image together with a white base, an image processing method which includes controlling preparation of the white base, and a non-transitory recording medium storing a computer-readable program for image processing.

BACKGROUND

In printing a source image created by using process colors of C (Cyan), M (Magenta), Y (Yellow) and K (Key Plate) on a transparent substrate or a colored opaque substrate, a technique to print a base or undercoat colored in W (White) (hereinafter, referred to as a white base) together with the source image is used in view of the fact that the appearance of the printed source image can change in color by being affected by light coming through the transparent substrate or the color of the opaque substrate. In printing a source image on a transparent substrate, a white base is generally printed as the uppermost layer on the substrate, because the printed source image is shown from the opposite side of the printed surface of the transparent substrate. In printing a source image on an opaque substrate, a white base is generally printed as the lowermost layer on the substrate.

In printing a source image with a white base on a transparent substrate or an opaque substrate, it takes time to print the source image and the white base separately, and thus there are demands for on-demand printers with high productivity, capable of printing five colors of W for a white base and CMYK for a source image in a single pass. When executing the above printing by using electrophotography, there is a limit of the amount of color materials (the amount of toners) that can be transferred and fixed on a substrate at one time, and therefore, a color material limit, which is generally given by the total sum of pixel values (in percentages) corresponding to all the colors of color materials, in other words, the total sum of percentage values of all the colors of color materials specified for a pixel, is defined for such printing. In view of that, a printing system is configured to execute a process of controlling or limiting the amount of color materials, which controls pixel values of a white base and a source image so that the total sum of the pixel values corresponding to the color materials of the white base and the source image at the same printing position does not exceed the color material limit.

As an example of the technique of controlling the amount of color materials, Japanese Unexamined Patent Publication (JP-A) No. 2009-029079, which corresponds to United States Patent Application Publication No. US2009/033956A1, discloses the following image processing method applicable to an image output device. The image output device is configured to use a base color material and process color materials to form a color image on a sheet, wherein colors of the image are defined on the basis of the total amount of the color materials given by a combination of the color materials per pixel. The image processing method includes a process of determining the total amount of the color materials given by a combination of the base color material and the process color materials per pixel, on the basis of an input pixel signal. The image processing method further includes a process of adjusting the number of the color materials to be combined, which includes a process of, if the determined total amount of the color materials is of a value in excess of an upper limit of the total amount of the color materials given by a combination of the color materials per pixel, which is defined for the image output device, reducing the number of the base color material or process color materials to be combined while maintaining colors to be produced, so that the total amount of the color materials does not exceed the upper limit of the total amount of the color materials.

As another example of the technique, JP-A No. 2009-055600, which corresponds to United States Patent Application Publication No. US2009/033961A1, discloses the following image processing method applicable to an image output device. The image output device is configured to use a base color material and process color materials to form a color image on a substrate, wherein colors of the image are defined on the basis of the total amount of the color materials given by a combination of the color materials per unit area. The image processing method includes a process of determining the provisional total amount of the color materials by adding the amount of the base color material being a certain value to the amount of the process color materials per unit area which are represented by a device signal supplied to the image output device. The processing method further includes a process of adjusting the total amount of the color materials which includes a process of reducing the provisional total amount of the color materials so that the provisional total amount of the color materials does not exceed the upper limit of the total amount of the color materials, defined for the image output device.

From an idealistic viewpoint, in order to secure the sufficient color reproducibility of a source image in printing the source image with a white base, the color material limit should be given by the sum of the maximum total amount of color materials of CMYK used in the source image and 100%. However, the color material limit that normal printing devices can handle is 400% or less, and it would be difficult to increase the color material limit because it needs a significant improvement of the capacities of the printing devices for transferring toner and fixing toner on a substrate and a significant improvement of color materials. One of actual solutions for the problem is a reduction of the amount of color materials, but a reduction of only either of the color materials of the source image or the color material of the white base has adverse effects on a color reproduction of the source image. Consideration is given to the reduction of the amount of color materials, with reference to the example that a printing device outputs secondary colors which are frequently used in color printing, wherein the color material limit of the printing device is less than 300%. The secondary colors are colors represented by combinations of the maximum possible values of two of the CMY primary colors specified for a pixel (the maximum possible pixel values indicating two of the CMY primary colors), such as R (Red) being a mixture of 100% M and 100%Y, G (Green) being a mixture of 100% C and 100% Y, and B (Blue) being a mixture of 100% C and 100% M, and are hereinafter referred to as pure secondary colors. In this example, both of the amount of color materials of the primary colors (C, M, Y) to be used for the source image and the amount of the white color material to be used for the white base should be reduced.

Consideration is further given to the reduction of the color materials to be used for the source image and the white base, with reference to two-valued pixels given after a screening (halftoning) process by using area gradation modulation or area coverage modulation. A screening (halftoning) process makes two-valued pixels including "colored" pixels and "uncolored" pixels for each of colors including the primary colors and white. Since a general screening process defines the arrangement of "colored" pixels and "uncolored" pixels in a stochastic manner, a composite image made of two-valued pixels corresponding to the primary colors and white given after the screening process, includes pixels colored in both of the primary color(s) and white, pixels colored just in the primary color(s), pixels colored just in white, and pixels colored in none of the primary colors and white. After studying about these types of pixel, the inventor has found that, if a source image has high-chroma color (color close to one of the pure secondary colors), pixels colored just in white excluding the primary colors have adverse effects on reproduction of the color (contribute less to realize high chroma), and if the source image has high-lightness color (color close to white), pixels colored just in white excluding the primary colors have favorable effects on reproduction of the color (contribute to realize high lightness).

SUMMARY

The present invention is directed to control apparatuses, image processing methods and non-transitory recording media each storing a computer-readable program for image processing, which can effectively prepare a white base to be printed together with a source image, to improve the color reproducibility of the source image.

A control apparatus reflecting one aspect of the present invention is a control apparatus for controlling a printing device configured to print a color source image together with a white base by using color materials of a plurality of colors including cyan, magenta and yellow for the color source image and a white color material for the white base. The control apparatus comprises: a raster-image processor that creates multi-valued pixels forming a color source image and multi-valued pixels forming a white base; and a hardware processor that performs the following operations. The operations include making a judgement whether each of the multi-valued pixels forming the color source image is colored in one of specific colors, and controlling the amount of the color materials to be used in printing the color source image together with the white base. The controlling the amount of the color materials is executed by reducing pixel values of the multi-valued pixels forming the color source image and pixel values of the multi-valued pixels forming the white base so that the total sum of the pixel values corresponding to colors of the color materials of the color source image and the pixel value corresponding to white of the white base at the same printing position becomes a predetermined value or less. The operations further include, by using screening, converting each of the multi-valued pixels forming the color source image and each of the multi-valued pixels forming the white base given after controlling the amount of the color materials, into matrixes of two-valued pixels corresponding to the colors of the color materials of the color source image and a matrix of two-valued white pixels corresponding to white of the white base, to create sets of two-valued pixels corresponding to the colors of the color materials, forming the color source image, and a set of two-valued white pixels forming the white base. The operations further include rearranging the two-valued white pixels. The rearranging the two-valued white pixels includes using the matrixes of two-valued pixels corresponding to the colors of the color materials of the color source image, obtained by converting each of the multi-valued pixels judged as being colored in one of the specific colors, to determine first pixel positions at each of which at least one of the two-valued pixels corresponding to primary colors of cyan, magenta and yellow is colored and second pixel positions at each of which none of two-valued pixels corresponding to the primary colors is colored. The rearranging the two-valued white pixels further includes using the matrix of two-valued white pixels, obtained by converting the multi-valued pixel forming the white base corresponding to the each of the multi-valued pixels judged as being colored in one of the specific colors, to rearrange at least one of colored two-valued white pixels at either of the first pixel positions or the second pixel positions in the matrix of two-valued white pixels, at a pixel position or positions at each of which a colored two-valued white pixel is absent among the other of the first pixel positions and the second pixel positions in the matrix of two-valued white pixels. The rearranging the two-valued white pixels further includes outputting the set of two-valued white pixels forming the white base, which have been rearranged.

An image processing method reflecting one aspect of the present invention is a method for use in a printing system including a printing device and a control apparatus for controlling the printing device. The printing device is configured to print a color source image together with a white base by using color materials of a plurality of colors including cyan, magenta and yellow for the color source image and a white color material for the white base. The method comprises: using a raster-image processor of the control apparatus to create multi-valued pixels forming a color source image and multi-valued pixels forming a white base; and judging by a hardware processor of the control apparatus whether each of the multi-valued pixels forming the color source image is colored in one of specific colors. The method further comprises controlling by the hardware processor the amount of the color materials to be used in printing the color source image together with the white base. The controlling the amount of the color materials is executed by reducing pixel values of the multi-valued pixels forming the color source image and pixel values of the multi-valued pixels forming the white base so that the total sum of the pixel values corresponding to colors of the color materials of the color source image and the pixel value corresponding to white of the white base at the same printing position becomes a predetermined value or less. The method further comprises, by using screening, converting by the hardware processor each of the multi-valued pixels forming the color source image and each of the multi-valued pixels forming the white base given after controlling the amount of the color materials, into matrixes of two-valued pixels corresponding to the colors of the color materials of the color source image and a matrix of two-valued white pixels corresponding to white of the white base, to create sets of two-valued pixels corresponding to the colors of the color materials, forming the color source image, and a set of two-valued white pixels forming the white base. The method further comprises rearranging the two-valued white pixels by the hardware processor. The rearranging the two-valued white pixels includes using the matrixes of two-valued pixels corresponding to the colors of the color materials of the color source image, obtained by converting each of the multi-valued pixels judged as being colored in one of the specific colors, to determine first pixel positions at each of which at least one of the two-valued pixels corresponding to primary colors of cyan, magenta and yellow is colored and second pixel positions at each of which none of two-valued pixels corresponding to the primary colors is colored. The rearranging the two-valued white pixels further includes using the matrix of two-valued white pixels, obtained by converting the multi-valued pixel forming the white base corresponding to the each of the multi-valued pixels judged as being colored in one of the specific colors, to rearrange at least one of colored two-valued white pixels at either of the first pixel positions or the second pixel positions in the matrix of two-valued white pixels, at a pixel position or positions at each of which a colored two-valued white pixel is absent among the other of the first pixel positions and the second pixel positions in the matrix of two-valued white pixels. The rearranging the two-valued white pixels further includes outputting by the hardware processor the set of two-valued white pixels forming the white base, which have been rearranged. The method further comprises receiving, by the printing device from the control apparatus, image data for printing which includes the sets of two-valued pixels corresponding to the colors of the color materials, forming the color source image, and the set of two-valued white pixels forming the white base, which have been rearranged; and using the printing device to print the color source image together with the white base on a basis of the image data for printing.

A non-transitory recording medium reflecting one aspect of the present invention stores a computer-readable program for image processing to be executed in a control apparatus for controlling a printing device. The printing device is configured to print a color source image together with a white base by using color materials of a plurality of colors including cyan, magenta and yellow for the color source image and a white color material for the white base. The control apparatus includes a raster-image processor that creates multi-valued pixels forming a color source image and multi-valued pixels forming a white base. The program comprises instructions which, when executed by a hardware processor of the control apparatus, cause the control apparatus to perform the following operations. The operations comprise obtaining the multi-valued pixels forming the color source image and the multi-valued pixels forming the white base, from the raster-image processor; judging whether each of the multi-valued pixels forming the color source image is colored in one of specific colors; and controlling the amount of the color materials to be used in printing the color source image together with the white base. The controlling the amount of the color materials is executed by reducing pixel values of the multi-valued pixels forming the color source image and pixel values of the multi-valued pixels forming the white base so that the total sum of the pixel values corresponding to colors of the color materials of the color source image and the pixel value corresponding to white of the white base at the same printing position becomes a predetermined value or less. The operations further comprise, by using screening, converting each of the multi-valued pixels forming the color source image and each of the multi-valued pixels forming the white base given after controlling the amount of the color materials, into matrixes of two-valued pixels corresponding to the colors of the color materials of the color source image and a matrix of two-valued white pixels corresponding to white of the white base, to create sets of two-valued pixels corresponding to the colors of the color materials, forming the color source image, and a set of two-valued white pixels forming the white base. The operations further comprise rearranging the two-valued white pixels. The rearranging the two-valued white pixels includes using the matrixes of two-valued pixels corresponding to the colors of the color materials of the color source image, obtained by converting each of the multi-valued pixels judged as being colored in one of the specific colors, to determine first pixel positions at each of which at least one of the two-valued pixels corresponding to primary colors of cyan, magenta and yellow is colored and second pixel positions at each of which none of two-valued pixels corresponding to the primary colors is colored. The rearranging the two-valued white pixels further includes using the matrix of two-valued white pixels, obtained by converting the multi-valued pixel forming the white base corresponding to the each of the multi-valued pixels judged as being colored in one of the specific colors, to rearrange at least one of colored two-valued white pixels at either of the first pixel positions or the second pixel positions in the matrix of two-valued white pixels, at a pixel position or positions at each of which a colored two-valued white pixel is absent among the other of the first pixel positions and the second pixel positions in the matrix of two-valued white pixels. The operations further comprise outputting, to the printing device, image data for printing which includes the sets of two-valued pixels corresponding to the colors of the color materials, forming the color source image, and the set of two-valued white pixels forming the white base, which have been rearranged.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention, wherein:

FIG. 14 is a flowchart illustrating an example of operations of the controller according to one embodiment of the present invention; and FIG. 15 is a flowchart illustrating an example of operations (rearrangement of two-valued white pixels) of the controller according to one embodiment of the present invention.

DETAILED DESCRIPTION OF EMBODIMENTS

Hereinafter, one or more embodiments of the present invention will be described with reference to the drawings. However, the scope of the invention is not limited to the illustrated embodiments.

As described in the above BACKGROUND, in printing five colors of W for a white base and CMYK for a source image in a single pass by using electrophotography, there is a limit of the amount of color materials (the amount of toners) that can be transferred and fixed on a substrate at one time, and therefore, a color material limit is defined for such printing. In the printing, a raster-image processor, profile creating section or print engine in a printing system executes a process of controlling the amount of color materials, which controls pixel values of a source image and a white base so that the total sum of the pixel values corresponding to colors of the color materials of the white base and the source image at the same printing position does not exceed the color material limit.

Figure 1A:
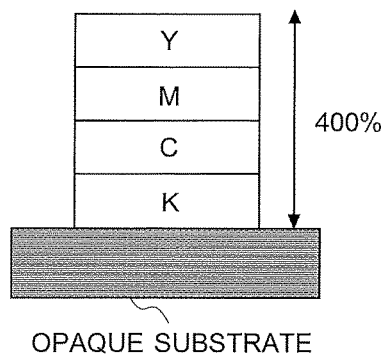
FIGS. 1A and 1B are schematic diagrams illustrating the maximum total pixel value in the case that four colors of CMYK are printed on an opaque substrate.
Figure 1B:
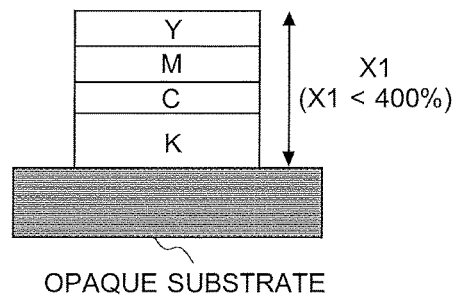

To execute the process of controlling the amount of color materials, the color material limit is defined according to the capacities of a printing device for transferring toner and fixing toner on a substrate. In the example that a printing device prints a source image by using color materials (toners) of CMYK on an opaque substrate like paper, the maximum total pixel value in source data is 400% as illustrated in FIG. 1A, and the maximum total pixel value X1 in source data given after the process of controlling the amount of color materials becomes less than 400% as illustrated in FIG. 1B, which needs a reduction of toner of each color. In the controlling process, the reduced toner amounts of the colors may be the same or different from each other, or the certain amounts of CMY toners may be replaced with the corresponding amount of K toner. The concrete toner amounts (for example, weight) of the colors each equivalent to "100%" may be different from each other.

Figure 2A:
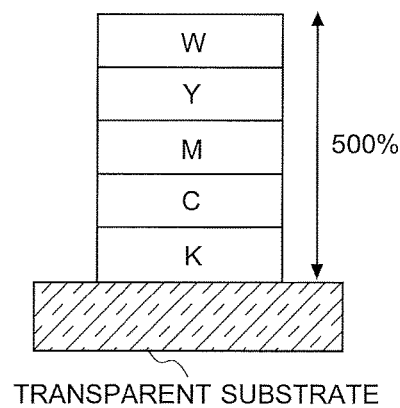
FIGS. 2A and 2B are schematic diagrams illustrating the maximum total pixel value in the case that five colors of CMYKW are printed on a transparent substrate.
Figure 2B:
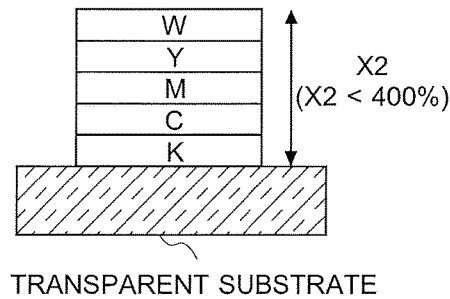

In another example that a printing device prints a source image by using CMYK color materials together with a base by using W color material on a transparent substrate like a plastic film, the W color material is printed as the uppermost layer on the transparent substrate in general and the maximum total pixel value in source data is 500%, as illustrated in FIG. 2A. Since an increase of the color material limit needs a significant improvement of the capacities of the printing device for transferring toner and fixing toner on a substrate and a significant improvement of toners, the maximum total pixel value X2 in the source data given after the process of controlling the amount of color materials in this example is still less than 400% as illustrated in FIG. 2B. A use of the W color material in this printing further reduces the possible color material amount assigned to each of CMYK colors. In another example that a printing device prints a source image by using CMYK color materials together with a base by using W color material on an opaque substrate, the W color material is printed as the lowermost layer on the opaque substrate in general. Similarly to the above example, the maximum total pixel value in the source data given after the process of controlling the amount of color materials is less than 400% and a use of the W color material in this printing also reduces the possible color material amount assigned to each of CMYK colors.

Figure 3A:
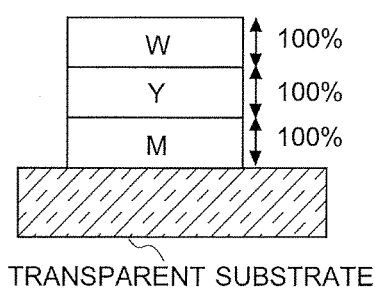
FIGS. 3A and 3B are schematic diagrams illustrating the maximum total pixel value in the case that white and one of the pure secondary colors are printed on a transparent substrate.
Figure 3B:
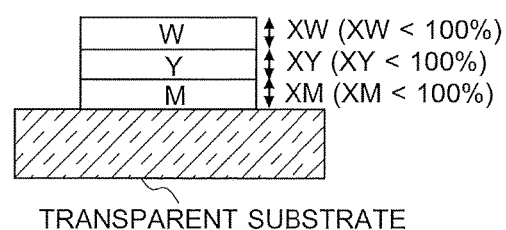

In another example that a printing device prints a source image of one of the pure secondary colors of red (C, M, Y, K=0, 100, 100, 0), green (C, M, Y, K=100, 0, 100, 0) and blue (C, M, Y, K=100, 100, 0, 0) (in this case, pure red) together with a base colored in W on a transparent substrate, the maximum total pixel value in the source data is 300% (100% for each of YMW colors) as illustrated in FIG. 3A. When the color material limit is much less than 300%, a problem arises in color reproduction of the pure secondary color. For example, in order to keep the pixel value corresponding to W 100% under the condition that the color material limit is less than 250%, the pixel value corresponding to each of primary colors forming the pure secondary color, given after the process of controlling the amount of color materials, should be less than 75%; or, in order to keep the pixel value corresponding to each of primary colors forming the pure secondary color 100% under the above-described condition, the pixel value corresponding to W, given after the process of controlling the amount of color materials, should be less than 50%. The both cases have great adverse effects on a color reproduction of the source image. From a practical standpoint, there is a need to reduce both of the toner amounts of the primary colors forming the pure secondary color and the toner amount of W, as illustrated in FIG. 3B. For example, under the condition that the color material limit is 240%, the toner amount of each of M, Y and W is reduced so that each of the maximum pixel values XM, XY and XW corresponding to M, Y and W becomes 80% equally after the process of controlling the amount of color materials.

Figure 4:
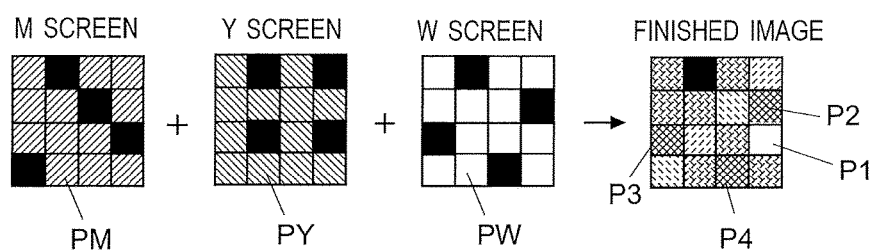
FIG. 4 is a schematic diagram illustrating a conventional screening process.

Consideration is given to the reduction of the color materials for the source image and the white base, with reference to two-valued pixels given after a screening (halftoning) process. A screening (halftoning) process makes two-valued pixels including "colored" pixels and "uncolored" pixels for each of colors including the primary colors and white. FIG. 4 illustrates an example of M screen, Y screen and W screen to be used for printing a source image of pure red together with a base colored in W, where the M screen, Y screen and W screen are given by reducing each of pixel values corresponding to M, Y and W specified for a pixel in the source image and the corresponding a white pixel in the base so as to reduce each of the toner amounts of M, Y and W to 75%, and performing a screening process on the pixel in the source image and the corresponding white pixel in the base. In the M screen, hatched pixels PM are pixels colored in M. In the Y screen, hatched pixels PY are pixels colored in Y. In the W screen, white pixels PW are pixels colored in W. In the M screen, Y screen and W screen, black pixels are pixels colored in none of M, Y and W. The finished image in FIG. 4 is an image given by combining these screens, wherein different combinations of colors are represented by different types of hatching. In the finished image, pixel P1 at row 3 and column 4 is colored just in white excluding the primary colors, and pixel P2 at row 2 and column 4, pixel P3 at row 3 and column 1, and pixel P4 at row 4 and column 3 are pixels colored just in primary colors excluding white.

Figure 5A:
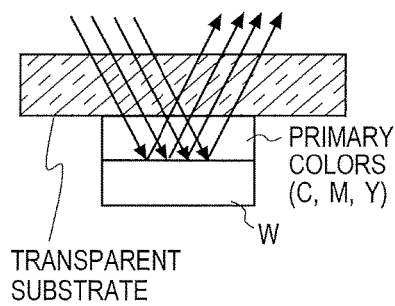
FIGS. 5A and 5B are schematic diagrams illustrating effects of a white base.
Figure 5B:
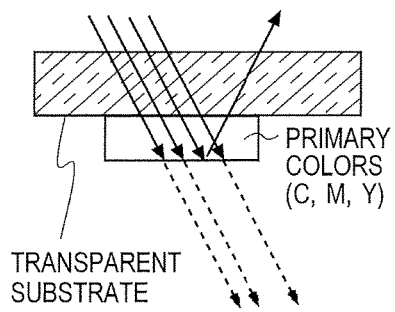

Since a general screening process defines the arrangement of "colored" pixels and "uncolored" pixels in a stochastic manner, a composite image made of two-valued pixels corresponding to the primary colors and white given after the screening process, includes pixels colored in both of the primary color(s) and white, pixels colored just in the primary color(s), pixels colored just in white, and pixels colored in none of the primary colors and white. A consideration of color reproduction on these types of pixels is given. As illustrated in FIG. 5A, at the position of a pixel where a white base is placed together with color materials of the primary colors (or a pixel where just a white base is present), incident light entering from the opposite side of the printed surface of the transparent substrate is reflected by the white base. Therefore, the color of the pixel is perceived as high-lightness and high-chroma color in comparison with a pixel without a white base. As illustrated in FIG. 5B, at the position of a pixel where no white base is placed, incident light entering from the opposite side of the printed surface of the transparent substrate passes through the color materials of the primary colors. Therefore, the color of the pixel is perceived as low lightness and low chroma color in comparison with a pixel with a white base.

As described above, a white base is important from the standpoint of improvement of lightness and chroma, but the screening process of a white base given after the process of controlling the amount of color materials does not place two-valued pixels colored in white at all the pixel positions. As a result of studies of favorable positions of colored two-valued white pixels forming a white base, the inventor has found that in a source image of high-chroma color (color close to one of the pure secondary colors), pixels colored only in white excluding the primary colors have adverse effects on reproduction of the color (contribute less to increase chroma); and that in a source image of high-lightness color (color close to white), pixels colored only in white excluding the primary colors have favorable effects on reproduction of the color (contribute to increase lightness).

In other words, considering color production by using matrixes of two-valued pixels corresponding to the primary colors and white both given after the screening process, the inventor has found that the color production depends on whether two-valued pixels colored in one of the primary colors are placed together with colored two-valued white pixel, even if the arrangement or coverage of the two-valued pixels colored in one of the primary colors is unchanged. The inventor has found that the color reproduction can be improved by judging whether each of multi-valued pixels forming a source image is colored in high-chroma color, which is close to one of the pure secondary colors, or high-lightness color, which is indicated by small pixel values corresponding to CMY colors and is close to white, and by using the judgement result to determine whether to overlap colored two-valued white pixels with two-valued pixels colored in one of the primary colors given after performing a screening process on the multi-valued pixels forming the source image.

In view of that, a control apparatus as one embodiment of the present invention is configured to perform the following processing, for printing a color source image together with a white base on a transparent or opaque substrate by using color materials (toners) of plural colors the source image and a white color material for the white base. In the printing, the amount of toners to be used for both of the color source image and the white base is reduced in order to print the color source image and the white base in a single path even under the tough condition that the color material limit is less than 250%. That is, the control apparatus, after performing a process of controlling the amount of color materials (toners) on multi-valued pixels forming a color source and a white base, converts, by using screening, each of the multi-valued pixels forming the color source image and each of the multi-valued pixels forming the white base, into matrixes of two-valued pixels corresponding to colors of the color materials of the color source image and a matrix of two-valued white pixels corresponding to white (the color of the white color material) of the white base. The control apparatus then uses the matrixes of two-valued pixels, obtained by converting each of the multi-valued pixels judged as being colored in one of the specific colors and the corresponding multi-valued pixel forming the white base, to rearrange at least one of the two-valued white pixels at first (or colored) pixel positions in the matrix of two-valued white pixels, at another or other pixel positions at each of which a colored two-valued white pixel is absent among second (or uncolored) pixel positions in the matrix of two-valued white pixels. Herein, the first (or colored) pixel positions are positions at each of which at least one of the two-valued pixels corresponding to the primary colors is colored, and the second (or uncolored) pixel positions are positions at each of which none of two-valued pixels corresponding to the primary colors is colored. In other words, the control apparatus rearranges the colored two-valued white pixels preferentially at the second (or uncolored) pixel positions at each of which none of two-valued pixels corresponding to the primary colors is colored. This rearrangement improves lightness of the printed source image. Alternatively, the control apparatus uses the matrixes of two-valued pixels, to rearrange at least one of the two-valued white pixels at the second (uncolored) pixel positions in the matrix of two-valued white pixels, at another or other pixel positions at each of which a colored two-valued white pixel is absent among the first (or colored) pixel positions. In other words, the control apparatus rearranges the colored two-valued white pixels preferentially at the first (or colored) pixel positions at each of which at least one of the two-valued pixels corresponding to the primary colors is colored. This rearrangement improves color production of the printed source image.

In concrete terms, the control apparatus defines a first ratio which is a ratio of the number of colored two-valued white pixels to be arranged at the first or colored pixel positions, to the total number of two-valued white pixels in the matrix of two-valued white pixels, and then, according to the first ratio, rearranges at least one of the colored two-valued white pixels at the second or uncolored pixel positions in the matrix of two-valued white pixels, at a pixel position or positions at each of which a colored two-valued white pixel is absent among the first or colored pixel positions in the matrix of two-valued white pixels. Alternatively, the control apparatus defines a second ratio which is a ratio of the number of colored two-valued white pixels to be arranged at the second or uncolored pixel positions, to the total number of two-valued white pixels in the matrix of two-valued white pixels, and then, according to the second ratio, rearranges at least one of the colored two-valued white pixels at the first or colored pixel positions in the matrix of two-valued white pixels, at a pixel position or positions at each of which a colored two-valued white pixel is absent among the second or uncolored pixel positions in the matrix of two-valued white pixels.

For example, when judging color of one of the multi-valued pixels forming the color source image as high-chroma color which is close to one of the pure secondary colors (judging the difference between the pixel value of one of the multi-valued pixels forming the color source image and a pixel value indicating one of the pure secondary colors is equal to or less than a predetermined threshold value), the control apparatus judges the color of the multi-valued pixel as one of specific colors. The control apparatus then performs the rearrangement of the two-valued white pixels according to the first ratio. In the rearrangement, the control apparatus may make the first ratio larger as the color of the multi-valued pixels is closer to the one of the secondary colors. Alternatively, when judging color of one of the multi-valued pixels forming the color source image as high-lightness color which is close to white (judging the difference between the pixel value of one of the multi-valued pixels forming the color source image and a pixel value indicating white is equal to or less than a predetermined threshold value), the control apparatus judges the color of the multi-valued pixel as one of specific colors. The control apparatus then performs the rearrangement of the two-valued white pixels according to the second ratio. In the rearrangement, the control apparatus may make the second ratio larger as the color of the multi-valued pixels is closer to white.

Figure 6A:
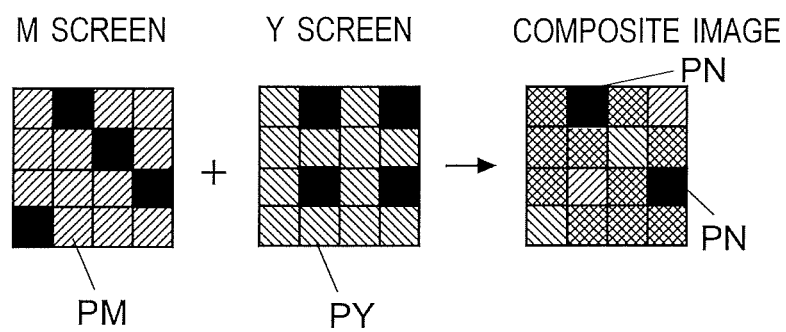
FIGS. 6A to 6C are schematic diagrams illustrating a rearrangement of white pixels given after a screening process, according to one embodiment of the present invention.
Figure 6B:
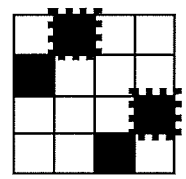
Figure 6C:
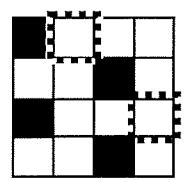

FIGS. 6A to 6C are schematic diagrams illustrating an image processing method employed in the present embodiment, in the case that a source image of pure red is printed together with a base colored in W. Similarly to the example of FIG. 4, FIGS. 6A to 6C illustrate an example of M screen and Y screen to be used for printing a source image of pure red, and examples of W screen (the first W screen and the second W screen) in which two-valued white pixels have been rearranged, where the M screen, Y screen and W screens are given by reducing each of pixel values corresponding to M, Y and W specified for a pixel in the source image and the corresponding white pixel in the base so as to reduce each of the toner amounts of M, Y and W to 75%, and performing a screening process on the pixel in the source image and the corresponding white pixel in the base. In the M screen in FIG. 6A, hatched pixels PM are pixels colored in M. In the Y screen in FIG. 6A, hatched pixels PY are pixels colored in Y. The composite image in FIG. 6A is an image given by combining these screens, wherein black pixels PN are uncolored pixels which are pixels colored in none of M and Y. When judging one of the multi-valued pixels forming the color source image as being colored in high-chroma color which is close to one of the pure secondary colors, the control apparatus rearranges two-valued white pixels so as to reduce colored two-valued white pixels at the positions of the uncolored pixels, which are enclosed with broken lines, as much as possible (in other words, arranges colored two-valued white pixels preferentially at the positions of the colored pixels), as illustrated in the first W screen in FIG. 6B. Such arrangement reduces the number of pixels colored just in W in the finished image given by combining the M screen, Y screen and first W screen. It improves color production of the printed source image. In this case, the number of pixels colored just in W in the finished image has been reduced to zero, while that in the finished image in FIG. 4 is one. On the other hand, when judging one of the multi-valued pixels forming the color source image as being colored in high-lightness color which is close to white, the control apparatus arranges colored two-valued white pixels preferentially at the positions of the uncolored pixels, which are enclosed with broken lines (in other words, rearranges two-valued white pixels so as to reduce colored two-valued white pixels at the positions of the colored pixels as much as possible), as illustrated in the second W screen in FIG. 6C. Such arrangement increases the number of pixels colored just in W in the finished image given by combining the M screen, Y screen and second W screen. It improves lightness of the printed source image. In this case, the number of pixels colored just in W in the finished image has been increased to two, while that in the finished image in FIG. 4 is one.

As described above, the control apparatus as one embodiment of the present invention is configured to prepare a white base to be printed with a source image in consideration of the chroma and lightness of each of multi-valued pixels forming the source image. That is, the control apparatus is configured to, when judging that one of multi-valued pixels forming the source image is colored in high-chroma color, prepare the corresponding white base in the way to improve the chroma of the source image, and when judging that one of multi-valued pixels forming the source image is colored in high-lightness color, prepare the corresponding white base in the way to improve the lightness of the source image. It deceases a reduction of the color gamut of the printed source image and realizes an excellent color production of the printed source image.

In the above descriptions, the reason why colored two-valued white pixels are arranged "preferentially" at the colored or uncolored pixel positions is that a screening process does not always create enough number of colored two-valued white pixels to be placed at all the colored or uncolored pixel positions. In particular, in the case that color of one of two-valued pixels forming a source image is close to white, it is because the color is reproduced favorably when a limited number of colored two-valued white pixels is arranged at the certain type of pixel positions.

Figure 7:
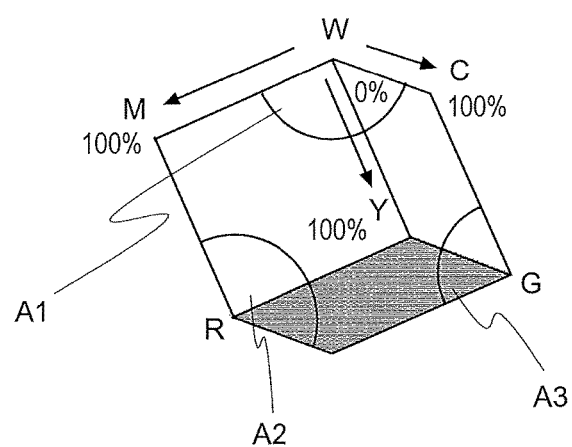
FIG. 7 is a schematic diagram illustrating a way to judge whether color of a pixel in a source image is close to white or one of the pure secondary colors.
Figure 8:
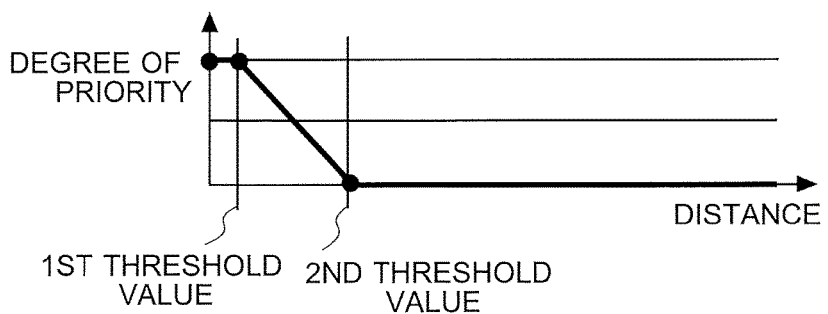
FIG. 8 is a schematic diagram illustrating an example of a determination whether color of a pixel in a source image is close to white or one of the pure secondary colors in a piecewise manner, according to the distance in a color space.

The judgement whether each of multi-valued pixels forming a source image is colored in "color close to one of the pure secondary colors" or "color close to white" can be made by the following operations. As illustrated in FIG. 7, a color space based on pixel values corresponding to the primary colors specified for a pixel is assumed, and the judgement can be made according to the distance of the color of the multi-valued pixel from the white point which is represented by (C, M, Y, K=0, 0, 0, 0) or the point of one of the pure secondary colors (R, G, B) in the color space. In FIG. 7, A1 indicates the range of colors which are judged as colors close to white, and A2 and A3 indicate the range of colors which are judged as colors close to pure red and the range of colors which are judged as colors close to pure green. The judgement may be made in a piecewise manner, as illustrated in FIG. 8, so as to give one of plural judgement results according to the distance of the color of the multi-valued pixel from the white point or the point of one of the pure secondary colors in the color space, rather than give one of two judgment results, like a judgement result that the color is close to the specific color or not, and may further define the degree of priority in arranging colored two-valued white pixels at the colored or uncolored pixel positions on the basis of the result. For example, the degree of the priority may be defined by using the following judgement threshold or thresholds, where a pixel value is indicated in percentage and the distance of the color of a multi-valued pixel from a specific color is given by calculating the square of a difference of the pixel value of the multi-valued pixel and the pixel value indicating the specific color (the white point or one of the pure secondary colors), for each of the primary colors, and calculating the square root of the sum of the squares calculated for the primary colors. In the case that the judgement is made according to the distance of the color of a multi-valued pixel from the point of one of the pure secondary colors, the degree of the priority may be defined by using one judgement threshold which is set within the range from 10 to 30 of the distance from the point of the pure secondary color, or preferably using the following two judgement thresholds so as to give one of three judgement results: the first threshold (for defining the upper limit of the distance which gives the maximum degree of the priority as a judgement result) set within the range from 0 to 10 of the distance, and the second threshold (for defining the lower limit of the distance which gives zero degree of the priority as a judgement result) set within the range from 15 to 35 of the distance. In another case that the judgement is made according to the distance of the color of a multi-valued pixel from the white point, the degree of the priority may be defined by using one judgement threshold which is set within the range from 20 to 40 of the distance from the white point, or preferably using the following two judgement thresholds so as to give one of three judgement results: the first threshold (for defining the upper limit of the distance which gives the maximum degree of the priority as a judgement result) set within the range from 15 to 25 of the distance, and the second threshold (for defining the lower limit of the distance which gives zero degree of the priority as a judgement result) set within the range from 35 to 45 of the distance.

The judgement whether one of multi-valued pixels forming a source image is colored in high-lightness color, which is color close to white, may be made in consideration of the difference between color materials in lightness. For example, since Y color material shows higher lightness than the other color materials in general, the distance may be calculated by weighting the pixel value corresponding to Y color material so that color at a longer distance (for example, equivalent to 1.5 to 2 times as long as the distance given by the original calculation) from the white point falls in the range of colors which are judged as being close to white.

Furthermore, the degree of the priority may be given as follows. That is, positions of two-valued pixels corresponding to the three primary colors (CMY) given after a screening process may be divided into four groups: a group of three-color pixel positions at each of which three of two-valued pixels corresponding to the primary colors are colored; a group of two-color pixel positions at each of which two of the two-valued pixels colored in the primary colors are present; a group of one-color pixel positions at each of which one of the two-valued pixels corresponding to the primary colors is colored; and a group of no-color pixel positions at each of which none of the two-valued pixels corresponding to the primary colors is colored. In rearrangement of two-value white pixels, the colored two-value white pixels may be arranged at respective pixel positions according to the degree of priority, where the degree of the priority decreases in the order of the group of two-color pixel positions, the group of one-color pixel positions, the group of three-color pixel positions and the group of no-color pixel positions.

EXAMPLES

Figure 9:
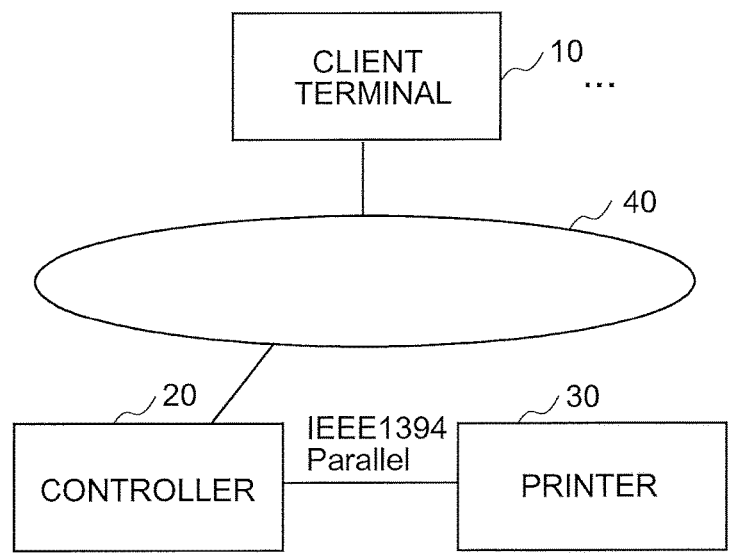
FIG. 9 is a schematic diagram illustrating an example of the constitution of a printing system according to one embodiment of the present invention.
Figure 10:
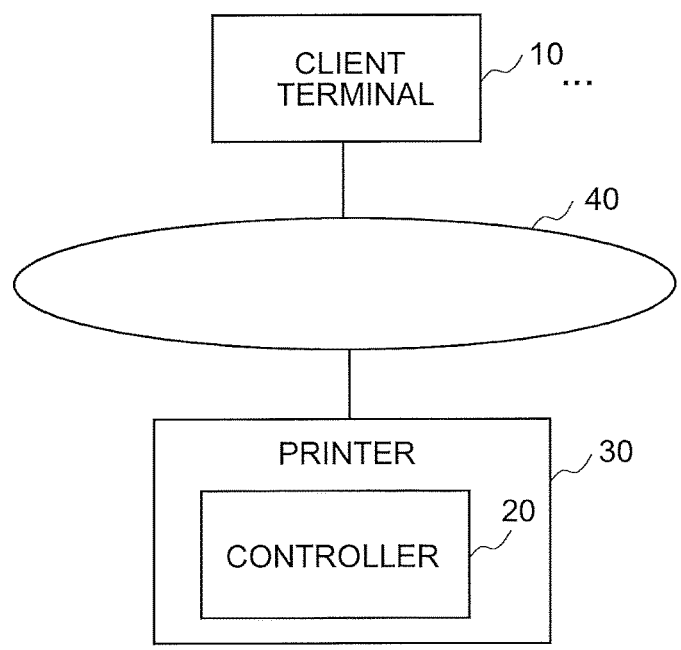
FIG. 10 is a schematic diagram illustrating another example of the constitution of a printing system according to one embodiment of the present invention.

In order to describe an embodiment of the present invention in more in detail, a description is given to one example of a control apparatus, an image processing method and a non-transitory medium storing an image processing program according to one embodiment of the present invention, with reference to FIGS. 9 to 15. Each of FIG. 9 and FIG. 10 is a schematic diagram illustrating a constitution example of a printing system of the present example. FIGS. 11A to 13 are block diagrams illustrating a constitution example of a client terminal, a controller and a printer of the present example. Each of FIG. 14 and FIG. 15 is a flowchart illustrating operations of the controller of the present example.

In the following descriptions, color materials of the process colors mean, for example, CMYK color materials, which exclude white color material; and color materials of the primary colors mean, for example, CMY color materials, which exclude white (W) color material which has less transparency than CMY color materials and black (K) color material which has less transparency and less reflectance than CMY color materials. Each pixel has pixel values corresponding to the colors of the color materials, where the pixel values are multi-valued pixel values represented in percentage or 8 bits. Pixel values in percentage correspond to, for example, pixel values of 8-bit input data ranging from 0 to 255, where 0% is equivalent to 0 of the 8-bit representation, and 100% is equivalent to 255 of the 8-bit representation.

As illustrated in FIG. 9, the printing system of the present example includes at least one client terminal 10, controller 20 and printer 30, which are located in an intranet so as to be communicably connected to each other via a communication network 40. As an example of the communication network 40, an Ethernet network may be used. Data transfer from controller 20 to printer 30 may be performed through a system conforming to the standards, such as IEEE 1394, parallel or the like, in place of the Ethernet.

In the example of FIG. 9, the printing system of the present example includes controller 20 and printer 30 as separated devises but controller 20 may be included in printer 30 as illustrated in FIG. 10. Hereinafter, a description of each apparatus is given on the assumption of the structure of the printing system shown in FIG. 9.

Figure 11A:
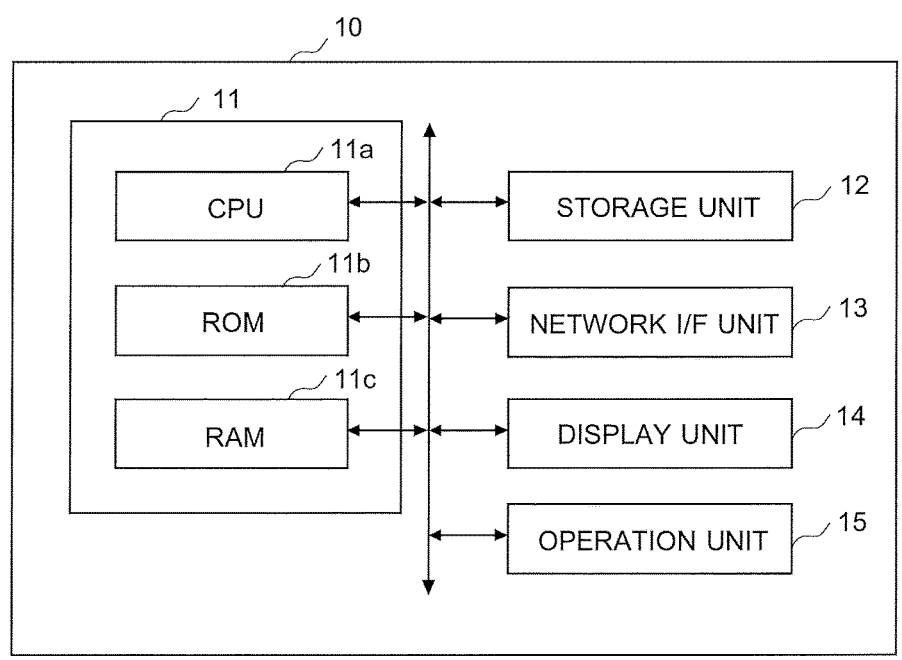
FIGS. 11A and 11B are block diagrams illustrating an example of the constitution of a client terminal according to one embodiment of the present invention.

Client Terminal:

Client terminals 10 is a computing device like a personal computer or the like. The client terminal 10 includes, as illustrated in FIG. 11A, control unit 11, storage unit 12, network interface (I/F) unit 13, display unit 13 and operation unit 15.

Figure 11B:
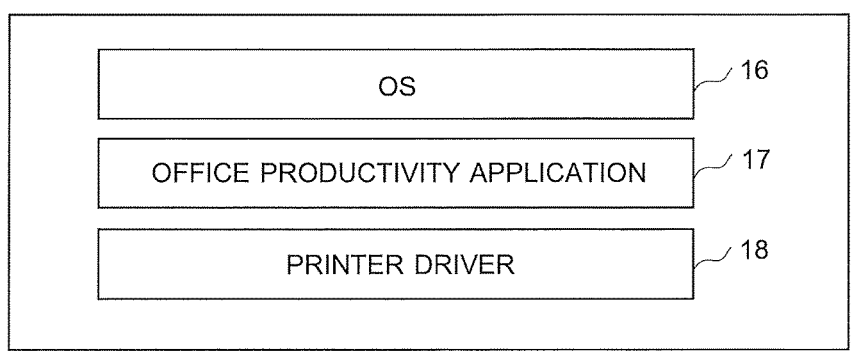

Control unit 11 includes CPU (Central Processing Unit) 11a and memories, such as ROM (Read Only Memory) 11b and RAM (Random Access Memory) 11c. CPU 11a reads control programs stored in ROM 11b or storage unit 12 to load the control programs onto RAM 11c, and then executes the control programs, thereby controlling the overall operations of client terminal 10. The control unit 11 (CPU 11a) is further configured to execute, as illustrated in FIG. 11B, OS (Operating System) 16, office productivity application 17 and printer driver 18 and other programs.

Examples of OS 16 include Windows, OS X, macOS and Android, where Windows is a registered trademark of Microsoft Corporation in the United States and/or other countries, OS X is a registered trademarks of Apple Inc. in the U.S. and other countries, macOS is a trademark of Apple Inc. in the U.S. and other countries, and Android is a trademark of Google Inc. in the United States and/or other countries. OS 16 manages office productivity application 17 and printer driver 18 in the client terminal 10 so as to function and run the programs.

Examples of office productivity application 17 include word processing, spreadsheet, and image processing software programs, which allow an operator to create a source image (preferably, a color source image) by using at least one of the process colors and specify an area where a white base is to be placed. When instructing to print original data created by the productivity application 17, office productivity application 17 invokes printer driver 18 and transfers the original data to the printer driver 18.

Printer driver 18 converts original data created by office productivity application 17, into a print job written in a language that controller 20 can interpret, where examples of the print job include PDL (Page Description Language) data written in page description languages, such as PJL (Printer Job Language), PS (PostScript) and PCL (Printer Control Language); and PDF (Portable Document Format) data. Such a print job includes a source image and information of an area where a white base is to be placed.

Storage unit 12 includes a memory, such as a HDD (Hard Disk Drive), a SSD (Solid State Drive) or the like, storing programs which, when being executed, cause CPU 11a to control the components of client terminal 10, information about processing and functions of client terminal 10, original data created by office productivity application 17, print jobs created by printer driver 18 and other data.

Network I/F unit 13 includes a NIC (Network Interface Card) and/or a modem. The network I/F unit 13 communicably connects client terminal 10 to communication network 40, so as to send a print job to controller 20.

Display unit 14 includes a display like a LCD (Liquid Crystal Display) or an OEL (organic electroluminescence) display, and is configured to display various types of screens of office productivity application 17 and printer driver 18, and others.

Operation unit 15 includes hardware devices, such as a mouse and a keyboard, and is configured to allow an operator to perform operations to create a source image and specify an area where a white base is to be placed by using office productivity application 17 and further allow an operator to perform operations for print instructions by using printer driver 18.

Figure 12A:
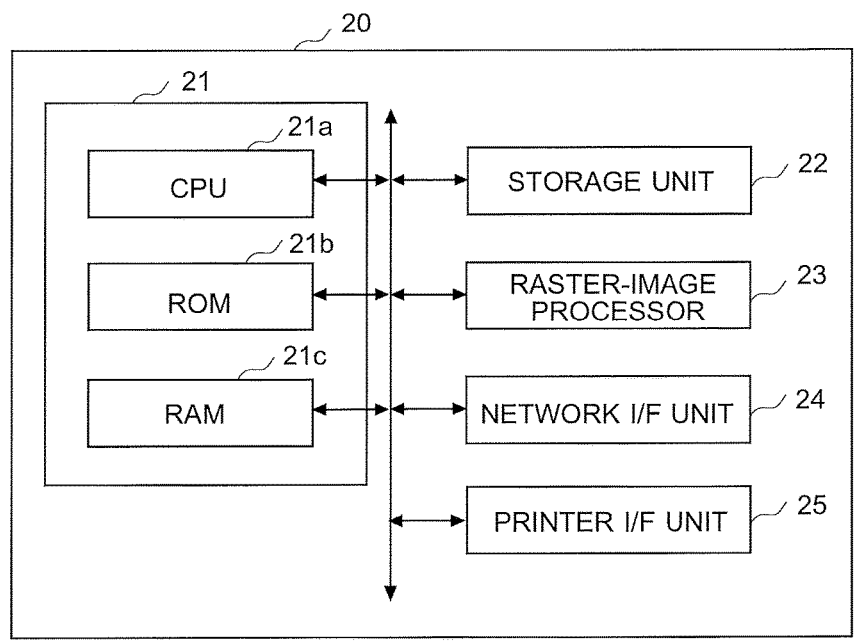
FIGS. 12A and 12B are block diagrams illustrating an example of the constitution of a controller according to one embodiment of the present invention.

Controller:

Controller 20 is a control apparatus for controlling printer 30. Controller 20 includes, as illustrated in FIG. 12A, control unit 21, storage unit 22, raster-image processor 23 and network interface (I/F) unit 24, printer interface (I/F) unit 25, and optionally includes a display unit and an operation unit.

Control unit 21 includes CPU 21a as a hardware processor, and memories, such as ROM 21b and RAM 21c. CPU 21a reads control programs stored in the ROM 21b or storage unit 22 to load the control programs onto RAM 21c, and then executes the control programs, thereby controlling the overall operations of controller 20.

Storage unit 22 includes a memory, such as a HDD, a SSD or the like. Storage unit 22 stores programs which, when being executed, causes CPU 21a to control the components of controller 20; print jobs received from client terminal 10; image data for printing, created on the basis of a print job; a correction LUT for printer 30; an ICC profile to be used for color conversion; and other data.

Raster-image processor 23 includes an image-processing ASIC (application specific integrated circuit) and is configured to perform the following operations. Raster-image processor 23 analyses a print job received from client terminal 10 to obtain a source image and information of an area where a white base is to be placed, and creates multi-valued bitmap data of the source image and the white base to obtain multi-valued pixels forming the source image and multi-valued pixels forming the white base. Raster-image processor then performs color conversion of the bitmap data so as to match the color of a finished product with desired color (for example, color conversion using an ICC profile), and outputs the resulting data to control unit 21.

Network I/F unit 24 includes a NIC and/or a modem. Network I/F unit 24 communicably connects controller 20 to communication network 40, so as to receive a print job or other data from client terminal 10. Printer I/F unit 25 is a dedicated interface for connecting controller 20 to printer 30, so as to output or send image data for printing or other data to printer 30 so as to give print instructions to printer 30.

Control unit 21 is further configured to work also as judging section 26, color-material controlling section 27, screening section 28 and pixel rearranging section 29 as illustrated in FIG. 11B. That is, control unit 21 is configured to obtain multi-valued pixels from raster-image processor 23, prepare image data for printing, which includes sets of two-valued pixels corresponding to the color materials, forming the source image and further includes a set of rearranged two-valued white pixels forming the white base, and then output the data to printer 30.

Judging section 26 is configured to judge whether each of multi-valued pixels forming a source image, obtained from raster-image processor 23, is colored in one of specific colors. In concrete terms, judging section 26 is configured to judge whether each of the multi-valued pixels forming a source image is colored in high-chroma color which is close to one of the pure secondary colors or high-lightness color which is close to white, and when judging that one of the multi-valued pixels is colored in color close to one of the pure secondary colors or color close to white, judge the multi-valued pixel as being colored in one of specific colors, where the specific colors are colors for which a different way to prepare the white base is used. The judgement of the color of each of the multi-valued pixels may use a color space based on pixel values corresponding to colors of color materials and may be made according to whether the distance of the color from the point of one of the pure secondary colors (R, G or B) or the white point indicated by (C, M, Y, K=0, 0, 0, 0) in the color space is equal to or less than a predetermined threshold value. The distance is given by calculating a difference of the pixel value of the multi-valued pixel and a pixel value indicating one of the pure secondary colors or white. Judging section 26 may make this judgement in a piecewise manner according to the distance of the color from the point of one of the pure secondary colors or the white point, in other words, the difference of the pixel value of the multi-valued pixel and a pixel value indicating one of the pure secondary colors or white, and may define the degree of priority in arranging colored two-valued white pixels at a certain type of pixel positions according to the judgement result.

Color-material controlling section 27 is configured to control the amount of color materials (toners) to be used in printing the source image together with the white base, by performing the following operations. That is, color-material limiting section 27 reduces both of pixel values of the multi-valued pixels forming the source image and pixel values of the multi-valued pixels forming the white base so that the total sum of the pixel values corresponding to colors of the color materials (toner colors) of the source image and the pixel value corresponding white (color of white color material or white toner) of the white base at the same printing position becomes a predetermined value or less. In this process, color-material controlling section 27 reduces the pixel values of multi-valued pixels of the source image and the white base so that each of pixel values of multi-valued pixels corresponding to the colors of the color materials of the source image and pixel values of multi-valued pixels corresponding the white color material of the white base becomes more than 0% and less than 100% after controlling the amount of the color materials (toners) to be used in printing the source image together with the white base. A use of the predetermined value less than 250% (for example, the predetermined value of 240%) brings especially great effects of the rearrangement of two-valued white pixels, and a use of the predetermined value less than 300% (for example, the predetermined value of 280%) brings sufficiently effects of the rearrangement of two-valued white pixels, because this predetermined value needs the process of controlling the amount of color materials in printing one of the pure secondary color and pure white together. A use of the predetermined value less than 400% (for example, the predetermined value of 350%) brings a certain degree of effects of the rearrangement of two-valued white pixels if conditions are met, because this predetermined value needs the process of controlling the amount of color materials in a certain situation of general four-color (CMYK) printing, such that printing one of the pure tertiary colors and pure white together without using a process of replacing CMY toners with K toner.

Screening section 28 is configured to use a known process of screening or halftoning, to convert each of multi-valued pixels forming the source image and each of multi-valued pixels forming the white base both given after controlling the amount of the color materials, into matrixes of two-valued pixels corresponding to the colors of the color materials of the color source image and a matrix of two-valued white pixels corresponding to white (the color of white color material) of the white base, and then create sets of two-valued pixels corresponding to the colors of the color materials, forming the source image, and a set of two-valued white pixels forming the white base. Examples of the screening process includes a process based on pseudo-random distribution of halftone dots or pixels, using frequency modulation to change the density of dots or pixels according to the gray level desired; and a screening process using area gradation modulation or area coverage modulation. Each of the two-valued pixels corresponding to colors of the color materials, given after the screening process has one-bit value (ON or OFF).

Pixel rearranging section 29 is configured to perform the following operations. That is, pixel rearranging section 29 extracts multi-valued pixels judged as being colored in one of the specific colors from the multi-valued pixels forming the source image, and uses the matrixes of two-valued pixels corresponding to the colors of the color materials of the source image, obtained by converting each of the extracted multi-valued pixels, to determine first pixel positions (colored pixel positions) at each of which at least one of the two-valued pixels corresponding to the CMY primary colors is colored and second pixel positions (uncolored pixel positions) at each of which none of two-valued pixels corresponding to the primary colors is colored. Pixel rearranging section 29 then uses the matrix of two-valued white pixels, obtained by converting the multi-valued pixel forming the white base corresponding to the each of the extracted multi-valued pixels, to rearrange at least one of the colored two-valued white pixels at either of the first pixel positions or the second pixel positions in the matrix of two-valued white pixels, at a pixel position or positions at each of which a colored two-valued white pixel is absent among the other of the first pixel positions and the second pixel positions in the matrix of two-valued white pixels. Pixel rearranging section 29 then outputs the rearrangement result (the set of two-valued white pixels forming the white base, which have been rearranged). In concrete terms, pixel rearranging section 29 defines a first ratio or a second ratio, where the first ratio is a ratio of the number of colored two-valued white pixels to be arranged at the first or colored pixel positions to the total number of two-valued white pixels in the matrix of two-valued white pixels, and the second ratio is a ratio of the number of colored two-valued white pixels to be arranged at the second pixel positions to the total number of two-valued white pixels in the matrix of two-valued white pixels. Then, pixel rearranging section 29 performs either of, according to the first ratio, rearranging at least one of the colored two-valued white pixels at the second pixel positions in the matrix of two-valued white pixels, at a pixel position or positions at each of which a colored two-valued white pixel is absent among the first pixel positions in the matrix of two-valued white pixels; or according to the second ratio, rearranging at least one of the colored two-valued white pixels at the first pixel positions in the matrix of two-valued white pixels, at a pixel position or-positions at each of which a colored two-valued white pixel is absent among the second pixel positions in the matrix of two-valued white pixels. In this process, when judging that one of the multi-valued pixels as being colored in high-chroma color, in other words, color close to one of the pure secondary colors, pixel rearranging section 29 performs the rearrangement of the two-valued white pixels according to the first ratio. It is preferable that pixel rearranging section 29 makes the first ratio larger (in other words, arranges the colored two-valued white pixels preferentially at the first or colored pixel positions) as the color of the multi-valued pixel is higher-chroma color, in other words, closer to one of the pure secondary colors. On the other hand, when judging that one of the multi-valued pixels as being colored in high-lightness color, in other words, color close to white, pixel rearranging section 29 performs the rearrangement of the two-valued white pixels according to the second ratio. It is preferable that pixel rearranging section 29 makes the second ratio larger (in other words, arranges the colored two-valued white pixels preferentially at the second or uncolored pixel positions) as the color of the multi-valued pixel is higher-lightness color, in other words, closer to white. When judging that one of the multi-valued pixels as being colored in color other than the above-described colors, pixel rearranging section 29 does not perform the rearrangement process on the matrix of two-valued white pixels, obtained by converting the multi-valued pixel forming the white base corresponding to the judged multi-valued pixel, in other words, leaves the arrangement of two-valued white pixels as it is.

The judging section 26, color-material controlling section 27, screening section 28 and pixel rearranging section 29 may be constituted as hardware devices. Alternatively, the judging section 26, color-material controlling section 27, screening section 28 and pixel rearranging section 29 may be provided by an image processing program which causes the control unit 21 to function as these sections when being executed by CPU 21a. That is, the control unit 21 may be configured to serve as the judging section 26, color-material controlling section 27, screening section 28 and pixel rearranging section 29, when CPU 21a l executes the image processing program.

Figure 13:
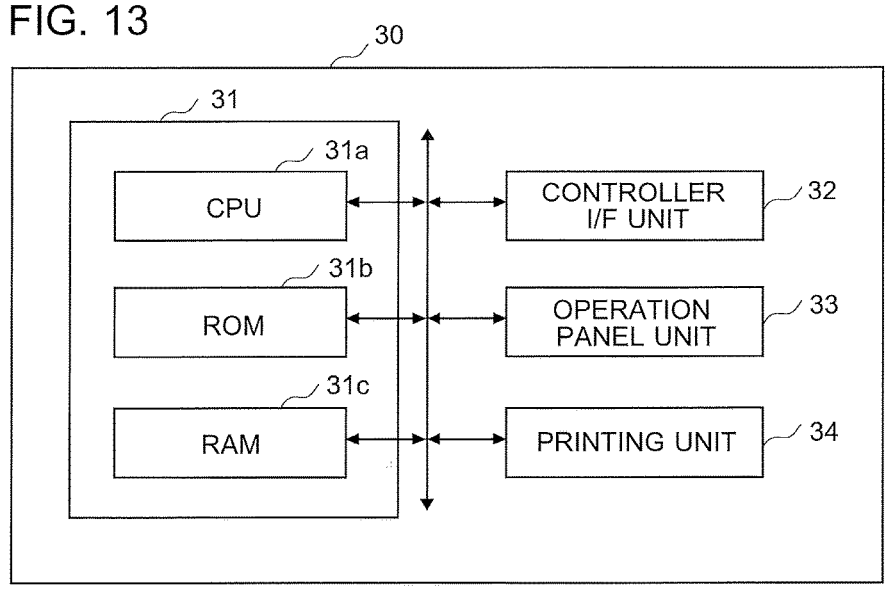
FIG. 13 is a block diagram illustrating an example of the constitution of a printer according to one embodiment of the present invention.

Printer:

Printer 30 is a printing device like an electrophotographic printer, and is configured to perform printing according to instructions given by controller 20. For example, printer 30 is configured to print a color source image together with a white base by using color materials of plural colors at least including CMY colors for the color source image and a white color material for the white base. As illustrated in FIG. 13, printer 30 includes control unit 31, controller interface (I/F) unit 32, operation panel unit 33 and printing unit 34.

Control unit 31 includes CPU 31a and memories including ROM 31b and RAM 31c. CPU 31a reads control programs stored in ROM 31b, loads the control programs onto RAM 31c, and executes the control programs, thereby performing the whole operations of the printer 30.

Controller interface unit 32 is a dedicated interface to be used for connecting printer 30 to controller 20. Controller interface unit 32 is configured to receive image data for printing and other data from controller 20.

Operation panel unit 33 is a device, such as a touch panel, which includes a display unit like a LCD and a touch sensor composed of transparent electrodes arranged in a lattice shape on the display unit. The operation panel unit 33 is configured to display various screens relating to printing and allow an operator to perform various operations relating to printing.

Printing unit 34 is a print engine configured to form images on sheets on the basis of image data for printing, received from controller 20. In concrete terms, in the printing unit 34, an exposure unit irradiates a photoreceptor drum, which was charged by a charging unit, with a laser beam in accordance with an image, to form latent images on the photoreceptor drum. A developing unit then develops the latent image by adhering charged toner onto the photoreceptor drum, and the developed toner image is transferred onto a transfer belt (first transfer processing), further is transferred from a transfer belt onto a sheet of paper (second transfer processing), and are fixed onto the sheet by a fixing unit. Printing unit 34 may be configured to further perform an arbitrary correction on the data so as to make the process of image forming stable.

It should be noted that FIG. 9 to FIG. 13 illustrate printing system of the present example for illustrative purpose only, and the constitution and control of each apparatus in the printing system may be modified appropriately.

Figure 12B:
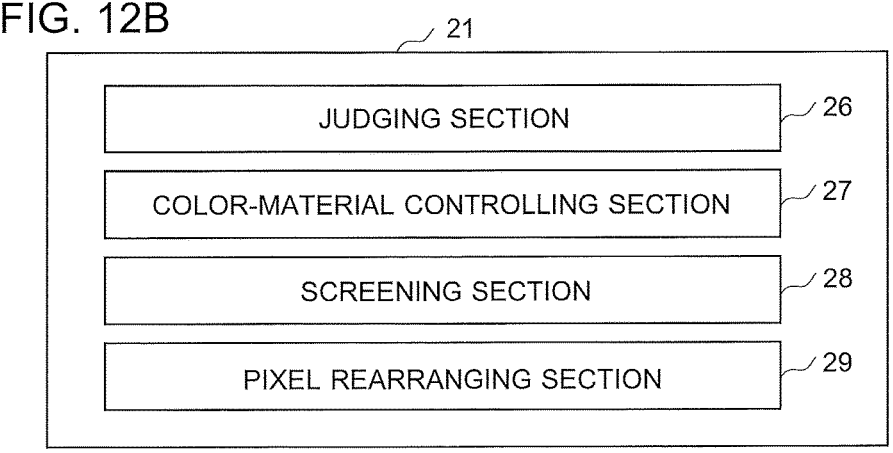

For example, control unit 21 in FIG. 12B serves as judging section 26, color-material controlling section 27, screening section 28 and pixel rearranging section 29. Alternatively, raster-image processor 23 may serve as judging section 26, color-material controlling section 27, screening section 28 and pixel rearranging section 29.

Hereinafter, a description is given to operations of controller 20 having the above-described construction. CPU 21a reads an image processing program stored in ROM 21b or storage unit 22, loads the program onto RAM 21c, and executes the program, thereby performing steps of the flowcharts illustrated in FIGS. 14 to 15.

First, raster-image processor 23 of controller 20 receives a source image and information of area where a white base is to be placed (S100), where the source image is an image created by using one or more process or printing colors (for example, CMYK colors), and preferably is a color image. The information of area where a white base is to be placed is given by using data of an arbitrary form. For example, spot-color data (data of a spot color plate) given by a known DTP (desktop publishing) application or data in a dedicated format may be given as the information.

Next, raster-image processor 23 creates multi-valued bitmap data of the source image and the white base, to obtain multi-valued pixels forming the source image and multi-valued pixels forming the white base (S110). In this process, raster-image processor 23 may further perform color conversion by using an ICC profile or another color correction of the data so as to obtain desired output colors.

Next, control unit 21 (judging section 26) judges whether each of the multi-valued pixels forming the source image is colored in one of the specific colors (colors for which a different way to prepare the white base is used) (S120). In concrete terms, control unit 21 (judging section 26) judges whether each of the multi-valued pixels is colored in high-chroma color which is close to one of the pure secondary colors or high-lightness color which is close to white, by using the difference between a pixel value of each of the multi-valued pixels and a pixel value indicating white or one of the secondary colors (represented by combinations of maximum possible values indicating two of the primary colors). After the judgement, control unit 21 (judging section 26) adds information about judged color to each of the multi-valued pixels so as to label each of the multi-valued pixels, for example, as "color close to one of the pure secondary colors", "color close to white", or "the other colors". In the case that control unit 21 (judging section 26) is configured to make the color judgement in detail, control unit 21 (judgement section 26) may label the each of the multi-valued pixels, for example, as "color close to the pure secondary color (100%)", "color close to the pure secondary color (80%)" or the like.

Next, control unit 21 (color-material controlling section 26) controls the total amount of color materials (S130). In concrete terms, control unit 21 (color-material controlling section 26) controls the amount of color materials to be used in printing the source image and the white base together, by reducing pixel values of the multi-valued pixels forming the source image and pixel values of the multi-valued pixels forming the white base so that the total sum of the pixel values corresponding to colors of the color materials of the source image and the pixel value corresponding to white of the white base at the same printing position becomes a predetermined value or less. Control unit 21 (color-material controlling section 26) may perform the process of limiting the total amount of color materials by using a well-known technique but preferably use a technique which can maintain both of the color gamut and the tone characteristics in a well-balanced manner.

Next, control unit 21 (screening section 28) performs screening or halftoning (creation of two-valued image data) on the multi-valued pixels forming the source image and the multi-valued white pixels forming the white base both given after limiting the total amount of color materials, in other words, converts each of the multi-valued pixels forming the source image and each of the multi-valued pixels forming the white base given after controlling the amount of the color materials, into matrixes of two-valued pixels corresponding to the colors of the color materials of the color source image and a matrix of two-valued white pixels corresponding to white of the white base. Control unit 21 (screening section 28) then creates sets of two-valued pixels corresponding to the colors of the color materials, forming the color source image, and a set of two-valued white pixels forming the white base. Control unit 21 (screening section 28) further judges presence of the primary colors (S140). Control unit 21 (screening section 28) can perform the screening or halftoning by using a well-known technique. Control unit 21 (screening section 28) then judges whether the two-valued pixels forming the source image is colored or uncolored in one of the primary colors, and labels each of the two-valued pixels as, for example, "colored" or "uncolored" in one of the primary colors.

Next, control unit 21 (pixel rearranging section 29) uses matrixes of two-valued pixels obtained by converting each of the multi-valued pixels judged as being colored in one of the specific colors (colors for which a different way to prepare the white base is used) in S120, to determine the first or colored pixel positions at each of which at least one of the two-valued pixels corresponding to the primary colors of is colored and the second or uncolored pixel positions at each of which none of two-valued pixels corresponding to the primary colors is colored. Control unit 21 (pixel rearranging section 29) then defines the first ratio or the second ratio (S150), wherein the first ratio is a ratio of a number of colored two-valued white pixels to be arranged at the first or colored pixel positions to the total number of two-valued white pixels in the matrix of two-valued white pixels, and the second ratio is a ratio of a number of colored two-valued white pixels to be arranged at the second or uncolored pixel positions to the total number of two-valued white pixels in the matrix of two-valued white pixels. In concrete terms, control unit 21 (pixel rearranging section 29) uses matrixes of two-valued pixels given by converting each of the multi-valued pixels judged as being colored in one of the specific colors in S120, to obtain the ratio of the number of colored two-valued pixels in the matrix of two-valued pixels corresponding to each color of the color materials, given after the process of controlling the amount of color materials in S130. Control unit 21 (pixel rearranging section 29) further uses the matrix of two-valued white pixels, obtained by converting the multi-valued pixel forming the white base corresponding to the each of the multi-valued pixels judged as being colored in one of the specific colors, to obtain the ratio of the number of colored two-valued pixels in the matrix of two-valued white pixels. Next, control unit 21 (pixel rearranging section 29) uses the obtained ratios to define the degree of priority in arranging colored two-valued white pixels at the colored or uncolored pixel positions (for example, which indicates the percentage of the pixel positions where the colored two-valued white pixels is to be arranged, to the colored pixel positions at each of which at least one of two-valued pixels corresponding to the primary colors is colored) so as to meet the above ratios. When the method to be used for the process of limiting the total amount of color materials has been defined in advance, the ratio of the colored two-valued white pixels can be calculated by using a LUT which has been created in advance.

Next, control unit 21 (pixel rearranging section 29) rearranges two-valued white pixels (S160). In other words, control unit 21 (pixel rearranging section 29) uses the matrix of two-valued white pixels, obtained by converting the multi-valued pixel forming the white base corresponding to the each of the multi-valued pixels judged as being colored in one of the specific colors, to rearrange at least one of the colored two-valued white pixels at either of the first pixel positions or the second pixel positions determined in S150, at a pixel position or positions at each of which a colored two-valued white pixel is absent among the other of the first pixel positions and the second pixel positions in the matrix of two-valued white pixels. FIG. 15 is a flowchart illustrating the process in detail. First, control unit 21 (pixel rearranging section 29) chooses one of the specific colors judged in S120 (S161). Next, control unit 21 (pixel rearranging section 29) extracts multi-valued pixels colored in the color chosen in S161 from the multi-valued pixels forming the source image, for each page or each object (S162). Next, control unit 21 (pixel rearranging section 29) uses the matrixes of two-valued pixels corresponding to colors of the color martials of the source image given by conversion of each of the extracted multi-valued pixels and further uses the corresponding matrixes of two-valued white pixels, to count the number of colored two-valued white pixels at the first or colored pixel positions at each of which at least one of the two-valued pixels corresponding to the primary colors is colored and the second or uncolored pixel positions at each of which none of the two-valued pixels corresponding to the primary colors is colored (S163). Control unit 21 (pixel rearranging section 29) then calculates excess or deficiency of the numbers of the colored two-valued white pixels in comparison with the ratio calculated in S150 (S164). For example, control unit 21 (pixel rearranging section 29) determines that 20% of the colored two-valued white pixels at the second or uncolored pixel positions exceeds the ratio and judges to rearrange the exceeded colored two-valued white pixels at a pixel position or positions at each of which a colored two-valued white pixel is absent among the first or colored pixel positions. Control unit 21 (pixel rearranging section 29) then defines the destination (pixel positions) of the colored two-valued white pixels to be rearranged (S165). It is preferable that control unit 21 (pixel rearranging section 29) defines the destination so as to distribute the colored two-valued white pixels uniformly in each page or object. Control unit 21 (pixel rearranging section 29) then rearranges the colored two-valued white pixels (S166), and judges whether the rearrangement has been completed for all the extracted multi-valued pixels (S167). When judging that the rearrangement has not been completed for all the extracted multi-valued pixels, control unit 21 (pixel rearranging section 29) goes back to S166 and further performs the rearrangement process. When judging that the rearrangement has been completed for all the extracted multi-valued pixels, control unit 21 (pixel rearranging section 29) judges whether the rearrangement has been completed for all the specific colors judged in S120 (S168). When judging that the rearrangement has not been completed for all the specific colors, control unit 21 (pixel rearranging section 29) goes back to S161 and further performs the succeeding processes. When judging that the rearrangement has been completed for all the specific colors, control unit 21 (pixel rearranging section 29) outputs the result of rearrangement (a set of the rearranged two-value white pixels), and terminates the processes of the flowchart.

Going back to the flowchart of FIG. 14, control unit 21 sends two-valued bitmap data (image data for printing) of the source image and the white base created from the set of two-valued pixels corresponding to colors of the color materials, forming the source image and the set of rearranged two-valued white pixels forming the white base, to printer 30 (S170). The image data for printing, to be sent to printer 30, may have an arbitrary format and control unit 21 may send the data together with additional information if it is needed. In response to receiving the image data for printing from controller 20, printer 30 prints the color source image together with the white base by using the color materials of plural of colors for the source image and a white color material for the white base, on the basis of the image data for printing.

As described above, when judging that one of multi-valued pixels forming the source image is colored in high-chroma color, which is color close to one of the pure secondary colors, control unit 21 of controller 20 improves color production of the source image, by rearranging two-valued pixels colored in white preferentially at the colored pixel positions (rearranges two-valued white pixels so as to reduce colored two-valued white pixels at the positions of the uncolored pixels as much as possible). On the other hand, when judging that one of multi-valued pixels forming the source image is colored in high-lightness color, which is color close to white, control unit 21 of controller 20 improves lightness the source image, by rearranging two-valued pixels colored in white preferentially at the uncolored pixel positions (rearranges two-valued white pixels so as to reduce colored two-valued white pixels at the positions of the colored pixels as much as possible). This processing decreases a reduction of the color gamut of the source image and realizes an excellent color reproduction of the source image.

The present invention should not be limited to the description in the above-mentioned examples, and the constitution and control may be modified appropriately unless the modification deviates from the intention of the present invention.

For example, the above-mentioned examples employs an electrophotographic printer as an example of printer 30, but an inkjet printer using UV (ultraviolet) curable inks can use the above-described image processing method similarly.

The present invention is applicable to control apparatuses configured to control a process of printing a source image together with a white base, image processing methods of controlling preparation of the white base, image processing programs executing the image processing method, and non-transitory recording media each storing the image processing program.

Although embodiments of the present invention have been described and illustrated in detail, it is clearly understood that the same is by way of illustration and example only and not limitation, the scope of the present invention should be interpreted by terms of the appended claims.

The invention claimed is:

1. A control apparatus for controlling a printing device configured to print a color source image together with a white base by using color materials of a plurality of colors including cyan, magenta and yellow for the color source image and a white color material for the white base, the control apparatus comprising:
    a raster-image processor that creates multi-valued pixels forming a color source image and multi-valued pixels forming a white base; and
    a hardware processor that
        makes a judgement whether each of the multi-valued pixels forming the color source image is colored in one of specific colors,
        controls an amount of the color materials to be used in printing the color source image together with the white base, by reducing pixel values of the multi-valued pixels forming the color source image and pixel values of the multi-valued pixels forming the white base so that a total sum of the pixel values corresponding to colors of the color materials of the color source image and the pixel value corresponding to white of the white base at a same printing position becomes a predetermined value or less,
        by using screening, converts each of the multi-valued pixels forming the color source image and each of the multi-valued pixels forming the white base given after controlling the amount of the color materials, into matrixes of two-valued pixels corresponding to the colors of the color materials of the color source image and a matrix of two-valued white pixels corresponding to white of the white base, to create sets of two-valued pixels corresponding to the colors of the color materials, forming the color source image, and a set of two-valued white pixels forming the white base, and
        rearranges the two-valued white pixels, including
            using the matrixes of two-valued pixels corresponding to the colors of the color materials of the color source image, obtained by converting each of the multi-valued pixels judged as being colored in one of the specific colors, to determine first pixel positions at each of which at least one of the two-valued pixels corresponding to primary colors of cyan, magenta and yellow is colored and second pixel positions at each of which none of two-valued pixels corresponding to the primary colors is colored,
            using the matrix of two-valued white pixels, obtained by converting the multi-valued pixel forming the white base corresponding to the each of the multi-valued pixels judged as being colored in one of the specific colors, to rearrange at least one of colored two-valued white pixels at either of the first pixel positions or the second pixel positions in the matrix of two-valued white pixels, at a pixel position or positions at each of which a colored two-valued white pixel is absent among the other of the first pixel positions and the second pixel positions in the matrix of two-valued white pixels, and
            outputting the set of two-valued white pixels forming the white base, which have been rearranged.

2. The control apparatus of claim 1,
    wherein in rearranging the two-valued white pixels, the hardware processor
        defines a first ratio or a second ratio, wherein the first ratio is a ratio of a number of colored two-valued white pixels to be arranged at the first pixel positions to a total number of two-valued white pixels in the matrix of two-valued white pixels, and the second ratio is a ratio of a number of colored two-valued white pixels to be arranged at the second pixel positions to a total number of two-valued white pixels in the matrix of two-valued white pixels, and
        performs either of,
            according to the first ratio, rearranging at least one of the colored two-valued white pixels at the second pixel positions in the matrix of two-valued white pixels, at a pixel position or positions at each of which a colored two-valued white pixel is absent among the first pixel positions in the matrix of two-valued white pixels, or
            according to the second ratio, rearranging at least one of the colored two-valued white pixels at the first pixel positions in the matrix of two-valued white pixels, at a pixel position or positions at each of which a colored two-valued white pixel is absent among the second pixel positions in the matrix of two-valued white pixels.

3. The control apparatus of claim 2,
    wherein the hardware processor
        in the judgement, obtains a difference between a pixel value of each of the multi-valued pixels forming the color source image and a pixel value indicating one of secondary colors represented by combinations of maximum possible values indicating two of the primary colors, and judges color of the multi-valued pixel the difference of which is equal to or less than a first threshold value, as one of the specific colors, and in rearranging the two-valued white pixels, performs rearranging the at least one of the colored two-valued white pixels according to the first ratio.

4. The control apparatus of claim 3,
wherein in rearranging the two-valued white pixels, the hardware processor makes the first ratio larger as the color of the multi-valued pixel is closer to the one of the secondary colors.

5. The control apparatus of claim 2,
wherein the hardware processor
in the judgement, obtains a difference between a pixel value of each of the multi-valued pixels forming the color source image and a pixel value indicating white, and judges color of the multi-valued pixel the difference of which is equal to or less than a second threshold value, as one of the specific colors, and in rearranging the two-valued white pixels, performs rearranging the at least one of the colored two-valued white pixels according to the second ratio.

6. The control apparatus of claim 5,
wherein in rearranging the two-valued white pixels, the hardware processor makes the second ratio larger as the color of the multi-valued pixel is closer to white.

7. A method of image processing for use in a printing system including a printing device and a control apparatus for controlling the printing device, the printing device being configured to print a color source image together with a white base by using color materials of a plurality of colors including cyan, magenta and yellow for the color source image and a white color material for the white base, the method comprising:

using a raster-image processor of the control apparatus to create multi-valued pixels forming a color source image and multi-valued pixels forming a white base;

judging by a hardware processor of the control apparatus whether each of the multi-valued pixels forming the color source image is colored in one of specific colors;

controlling by the hardware processor an amount of the color materials to be used in printing the color source image together with the white base, by reducing pixel values of the multi-valued pixels forming the color source image and pixel values of the multi-valued pixels forming the white base so that a total sum of the pixel values corresponding to colors of the color materials of the color source image and the pixel value corresponding to white of the white base at a same printing position becomes a predetermined value or less;

by using screening, converting by the hardware processor each of the multi-valued pixels forming the color source image and each of the multi-valued pixels forming the white base given after controlling the amount of the color materials, into matrixes of two-valued pixels corresponding to the colors of the color materials of the color source image and a matrix of two-valued white pixels corresponding to white of the white base, to create sets of two-valued pixels corresponding to the colors of the color materials, forming the color source image, and a set of two-valued white pixels forming the white base;

rearranging by the hardware processor the two-valued white pixels, including using the matrixes of two-valued pixels corresponding to the colors of the color materials of the color source image, obtained by converting each of the multi-valued pixels judged as being colored in one of the specific colors, to determine first pixel positions at each of which at least one of the two-valued pixels corresponding to primary colors of cyan, magenta and yellow is colored and second pixel positions at each of which none of two-valued pixels corresponding to the primary colors is colored, using the matrix of two-valued white pixels, obtained by converting the multi-valued pixel forming the white base corresponding to the each of the multi-valued pixels judged as being colored in one of the specific colors, to rearrange at least one of colored two-valued white pixels at either of the first pixel positions or the second pixel positions in the matrix of two-valued white pixels, at a pixel position or positions at each of which a colored two-valued white pixel is absent among the other of the first pixel positions and the second pixel positions in the matrix of two-valued white pixels, and outputting by the hardware processor the set of two-valued white pixels forming the white base, which have been rearranged;

receiving, by the printing device from the control apparatus, image data for printing which includes the sets of two-valued pixels corresponding to the colors of the color materials, forming the color source image, and the set of two-valued white pixels forming the white base, which have been rearranged; and using the printing device to print the color source image together with the white base on a basis of the image data for printing.

8. The method of claim 7,
wherein the rearranging includes
defining a first ratio or a second ratio, wherein the first ratio is a ratio of a number of colored two-valued white pixels to be arranged at the first pixel positions to a total number of two-valued white pixels in the matrix of two-valued white pixels, and the second ratio is a ratio of a number of colored two-valued white pixels to be arranged at the second pixel positions to a total number of two-valued white pixels in the matrix of two-valued white pixels, and performing either of,
according to the first ratio, rearranging at least one of the colored two-valued white pixels at the second pixel positions in the matrix of two-valued white pixels, at a pixel position or positions at each of which a colored two-valued white pixel is absent among the first pixel positions in the matrix of two-valued white pixels, or according to the second ratio, rearranging at least one of the colored two-valued white pixels at the first pixel positions in the matrix of two-valued white pixels, at a pixel position or positions at each of which a colored two-valued white pixel is absent among the second pixel positions in the matrix of two-valued white pixels.

9. The method of claim 8,
wherein the judging includes obtaining a difference between a pixel value of each of the multi-valued pixels forming the color source image and a pixel value indicating one of secondary colors represented by combinations of maximum possible values indicating two of the primary colors, and judging color of the multi-valued pixel the difference of which is equal to or less than a first threshold value, as one the of specific colors, and the rearranging includes performing rearranging the at least one of the colored two-valued white pixels according to the first ratio.

10. The method of claim 9,
wherein the rearranging includes making the first ratio larger as the color of the multi-valued pixel is closer to the one of the secondary colors.

11. The method of claim 8,
wherein the judging includes obtaining a difference between a pixel value of each of the multi-valued pixels forming the color source image and a pixel value indicating white, and judging color of the multi-valued pixel the difference of which is equal to or less than a second threshold value, as one of the specific colors, and the rearranging includes performing rearranging the at least one of the colored two-valued white pixels according to the second ratio.

12. The method of claim 11,
wherein the rearranging includes making the second ratio larger as the color of the multi-valued pixel is closer to white.

13. A non-transitory recording medium storing a computer-readable program for image processing to be executed in a control apparatus for controlling a printing device configured to print a color source image together with a white base by using color materials of a plurality of colors including cyan, magenta and yellow for the color source image and a white color material for the white base, the control apparatus including a raster-image processor that creates multi-valued pixels forming a color source image and multi-valued pixels forming a white base, the program comprising instructions which, when executed by a hardware processor of the control apparatus, cause the control apparatus to perform operations comprising:

obtaining the multi-valued pixels forming the color source image and the multi-valued pixels forming the white base, from the raster-image processor;

judging whether each of the multi-valued pixels forming the color source image is colored in one of specific colors;

controlling an amount of the color materials to be used in printing the color source image together with the white base, by reducing pixel values of the multi-valued pixels forming the color source image and pixel values of the multi-valued pixels forming the white base so that a total sum of the pixel values corresponding to colors of the color materials of the color source image and the pixel value corresponding to white of the white base at a same printing position becomes a predetermined value or less;

by using screening, converting each of the multi-valued pixels forming the color source image and each of the multi-valued pixels forming the white base given after controlling the amount of the color materials, into matrixes of two-valued pixels corresponding to the colors of the color materials of the color source image and a matrix of two-valued white pixels corresponding to white of the white base, to create sets of two-valued pixels corresponding to the colors of the color materials, forming the color source image, and a set of two-valued white pixels forming the white base;

rearranging the two-valued white pixels, including using the matrixes of two-valued pixels corresponding to the colors of the color materials of the color source image, obtained by converting each of the multi-valued pixels judged as being colored in one of the specific colors, to determine first pixel positions at each of which at least one of the two-valued pixels corresponding to primary colors of cyan, magenta and yellow is colored and second pixel positions at each of which none of two-valued pixels corresponding to the primary colors is colored, and using the matrix of two-valued white pixels, obtained by converting the multi-valued pixel forming the white base corresponding to the each of the multi-valued pixels judged as being colored in one of the specific colors, to rearrange at least one of colored two-valued white pixels at either of the first pixel positions or the second pixel positions in the matrix of two-valued white pixels, at a pixel position or positions at each of which a colored two-valued white pixel is absent among the other of the first pixel positions and the second pixel positions in the matrix of two-valued white pixels; and outputting, to the printing device, image data for printing which includes the sets of two-valued pixels corresponding to the colors of the color materials, forming the color source image, and the set of two-valued white pixels forming the white base, which have been rearranged.

14. The non-transitory recording medium of claim 13,
wherein the rearranging includes
defining a first ratio or a second ratio, wherein the first ratio is a ratio of a number of colored two-valued white pixels to be arranged at the first pixel positions to a total number of two-valued white pixels in the matrix of two-valued white pixels, and the second ratio is a ratio of a number of colored two-valued white pixels to be arranged at the second pixel positions to a total number of two-valued white pixels in the matrix of two-valued white pixels, and performing either of,
according to the first ratio, rearranging at least one of the colored two-valued white pixels at the second pixel positions in the matrix of two-valued white pixels, at a pixel position or positions at each of which a colored two-valued white pixel is absent among the first pixel positions in the matrix of two-valued white pixels, or according to the second ratio, rearranging at least one of the colored two-valued white pixels at the first pixel positions in the matrix of two-valued white pixels, at a pixel position or positions at each of which a colored two-valued white pixel is absent among the second pixel positions in the matrix of two-valued white pixels.

15. The non-transitory recording medium of claim 14,
wherein the judging includes obtaining a difference between a pixel value of each of the multi-valued pixels forming the color source image and a pixel value indicating one of secondary colors represented by combinations of maximum possible values indicating two of the primary colors, and judging color of the multi-valued pixel the difference of which is equal to or less than a first threshold value, as one of the specific colors, and the rearranging includes performing rearranging the at least one of the colored two-valued white pixels according to the first ratio.

16. The non-transitory recording medium of claim 15, wherein the rearranging includes making the first ratio larger as the color of the multi-valued pixel is closer to the one of the secondary colors.

17. The non-transitory recording medium of claim 14, wherein the judging includes obtaining a difference between a pixel value of each of the multi-valued pixels forming the color source image and a pixel value indicating white, and judging color of the multi-valued pixel the difference of which is equal to or less than a second threshold value, as one of the specific colors, and the rearranging includes performing rearranging the at least one of the colored two-valued white pixels according to the second ratio.

18. The non-transitory recording medium of claim 17, wherein the rearranging includes making the second ratio larger as the color of the multi-valued pixel is closer to white.

\* \* \* \* \*